UNITED STATES PATENT OFFICE 2,647,109

EMULSION POLYMERIZATION IN THE PRESENCE OF AN IMPROVED REDUCING COMPOSITION

Izaak M. Kolthoff, Minneapolis, Minn., and Avrom I. Medalia, Brookhaven, N. Y., assignors to Phillips Petroleum Company, a corporation of Delaware No Drawing. Application February 27, 1950, Serial No. 146,638

9 Claims. (Cl. 260—84.1)

This invention relates to polymerizing unsaturated organic compounds while dispersed in an aqueous medium. In one important aspect, this invention relates to the production, and use, of a highly effective reducing composition, along with an oxidant, to catalyze an emulsion polymerization reaction.

Numerous recipes have been developed for carrying out polymerization reactions in aqueous emulsion. The increasing interest in low temperature polymerization has led to various formulations in which different types of activator systems have been employed. Among the recipes employed are those of the redox type which comprise an organic reducing agent either in admixture with or in combination with a heavy metal salt. Organic reducing agents which have been widely used are sugars such as glucose, levulose, sorbose, invert sugar, and the like. In view of the interest in low temperature polymerization, any modifications and improvements in recipes and in activator systems are valuable contributions to the art.

We have now discovered new activator compositions for use in redox emulsion polymerization recipes. These activators comprise an iron salt, an alkali metal pyrophosphate, and as the reducing component, a composition prepared by the interaction of an organic polyhydroxy compound and hydrogen peroxide in the presence of a ferrous salt. Rapid conversion rates are realized through the use of these activator compositions and they are therefore particularly applicable when polymerizations are carried out at low temperatures.

An object of this invention is to polymerize unsaturated organic compounds.

Another object of this invention is to provide an organic reducing composition suitable for use as a component of a catalytic composition comprising a combination of an oxidant and a reductant.

A further object of this invention is to provide an improved process for the production of synthetic rubber.

Further objects and advantages of this invention will become apparent, to one skilled in the art, from the accompanying disclosure and discussion.

In the preparation of the activator compositions, the reducing component is first prepared by treating an organic polyhydroxy compound with hydrogen peroxide in the presence of a ferrous salt. In one embodiment a mixture of the organic polyhydroxy compound, such as glycerol, ferrous sulfate, and water is brought to the desired temperature and treated with a 30 per cent aqueous solution of hydrogen peroxide. The hydrogen peroxide may be added continuously over a period of several hours, say from one to five hours, or it may be added slowly at first, that is, at such a rate that the peroxide is consumed as fast as it is introduced, after which the remainder is added more rapidly, or even all at once. In an alternative procedure the mixture of glycerol, ferrous salt, and water is prepared and brought to the desired temperature after which a 6 per cent hydrogen peroxide solution is introduced in any of the ways mentioned above. In any event, after all the hydrogen peroxide has been introduced the reaction is allowed to proceed until the concentration of hydrogen peroxide in the reaction mixture is less than 0.1 molar. A concentration of 0.01 molar is considered satisfactory. If desired, treatment of the organic polyhydroxy compound may be effected in the presence of a dilute mineral acid such as 0.01 normal sulfuric acid.

At the conclusion of the reaction, the resulting reaction mixture can be employed as such in polymerization reactions, or its acidity may be neutralized by an appropriate method, such as by shaking with calcium carbonate until the evolution of carbon dioxide ceases, and a portion of the neutralized mixture used. If desired, the neutralized solution may be concentrated by evaporation of the water, such as at about 50° C. in vacuo, until the volume has been considerably reduced and a viscous syrup remains. This product can then be treated by the addition of a low-boiling alcohol, at a temperature of around 70° C., filtered to separate the organic compounds from precipitated iron and calcium salts, and the filtrate concentrated to a syrup by vacuum distillation. The resulting material is then employed in polymerization reactions.

The amounts of ferrous salt and organic polyhydroxy compound employed are variable. In general the amount (in mols) of polyhydroxy compound used per mol of ferrous salt is in excess of 1:1 and frequently the mol ratio is 3:1 or even greater. However, it will usually not exceed 10:1. The amount of hydrogen peroxide employed is expressed in relation to the organic polyhydroxy compound used. In general it is preferred that the polyhydroxy compound be present in excess, but in some instances this is not necessarily the case. Excellent results are obtained when the mol ratio of polyhydroxy compound to hydrogen peroxide is as high as 5:1 but more frequently it is preferred to operate with a ratio of 3:1 or less. In some instances satisfactory results are obtained when the hydrogen peroxide is used in excess, that is, the mol ratio of polyhydroxy compound to hydrogen peroxide may be as low as 0.3:1.

In the preparation of such a composition as hereinbefore described, the temperature is critical. It is governed partially by the concentration of the hydrogen peroxide employed and by the rate of addition to the polyhydroxy compound-ferrous salt mixture. It is also dependent upon the polyhydroxy compound used. In general the temperature is within the range from 15 to 70° C. with a range of 25 to 55° C. being most frequently preferred. However, in some instances it may be advantageous to carry out this treating procedure at 0° C. or below.

The polyhydroxy components which are regarded as most effective for use in preparing the activator compositions of this invention are compounds in which there are two or more adjacent hydroxyl groups. For the preparation of these reductants, polyhydroxy compounds such as ethylene glycol, glycerol, tartaric acid, various polyhydroxy aldoses and ketoses of higher molecular weight, such as common sugars, as fructose, glucose, and sucrose, and the like, are employed. They will contain from two to twelve carbon atoms per molecule.

The invention is not dependent upon any particular mechanism involved when preparing the reducing components which comprise an important part of the activator systems herein described. In all probability there is an initial reaction between the hydrogen peroxide and ferrous ions which results in the formation of free radicals. When the polyhydroxy compound is glycerol, it is attacked by these free radicals with the resultant formation of oxidation products comprising simple alpha hydroxy aldehydes and ketones, such as a mixture of dihydroxyacetone and glyceraldehyde. It is to be noted, however, that polyhydroxy compounds which already contain adjacent hydroxyl and aldehyde or ketone groups, such as the sugars, produce compositions of greater activity for use in emulsion polymerization reactions, when treated as discussed herein.

The activator compositions used in the emulsion polymerization comprise an iron salt, a pyrophosphate, and a reducing component such as is hereinbefore described. Any water-soluble iron salt, either ferrous or ferric, is applicable. However, of the iron salts which can be employed, ferrous sulfate and ferric nitrate are most generally preferred. The water-soluble pyrophosphates most frequently used are those of sodium and potassium. The pyrophosphate and the iron salt can be reacted together to form an iron pyrophosphate complex, prior to their introduction into the polymerization reaction mixture. This complex can be prepared by admixing the iron salt with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $$2Na_2FeP_2O_7 \cdot Na_4P_2O_7$$

or perhaps $Na_2FeP_2O_7$. In any event the complex whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as the metal is present primarily in the lower of two valence states.

The amounts of activator ingredients are usually expressed in terms of the monomers charged. The multivalent metal should be within the range of about 0.01 to 1 millimol per 100 parts by weight of monomers, with 0.03 to 0.5 millimol being generally preferred. The amount of pyrophosphate should be within the range of about 0.1 to 15 millimols based on 100 parts by weight of monomers; however, the narrower range of 0.2 to 10 millimols is more frequently preferred. In addition to these activator ingredients, the polymerization recipe contains an oxidizing component such as a peroxidic material. Organic hydroperoxides such as cumene hydroperoxide also more formally known as phenyl (dimethyl) hydroperoxymethane, and various homologues and derivatives thereof, are generally preferred, but other peroxidic materials are applicable. In general, these hydroperoxides will range from those having from four to thirty carbon atoms per molecule, such as tertiary-butyl hydroperoxide, methylcyclohexyl hydroperoxide, phenylhexadecyl hydroperoxide, and the like.

In view of the fact that the activator composition charged to the polymerization reaction is a reaction mixture, and not a pure compound, it is a little difficult to define the amount of materials charged to the polymerization in absolute numerical terms. Therefore, it is more accurate, as well as more convenient, to so prepare the activator compositions, and to use the resulting compositions in amounts, such that these compositions are defined in terms of the original ingredients used to make these activators.

When measured in millimols, the units of weight should be the same throughout, i. e. when the monomeric material is measured in pounds these ingredients are measured in millipound mols, or thousandths of pound mols. The amounts of the activator ingredients used in conducting the polymerization are expressed in relationship to each other and to the peroxidic material employed. The quantity of each activator ingredient is also frequently expressed in terms of 100 parts by weight of monomers. The amount of multivalent metal and of pyrophosphate present have been discussed. The amount of peroxidic material employed in the polymerization is generally such that at least a slight molar excess is present with respect to the iron salt if ferrous. Ordinarily the amount will range from 0.06 to 4 millimols per 100 parts monomers, with the preferred amount being less than 2 millimols. The amount of peroxidic material introduced will depend upon the polymerization temperature and the quantities of the other catalytic materials present in any particular instance. Since the reducing component in the activator system comprises oxidation products resulting from the treatment of a polyhydroxy compound with hydrogen peroxide, the amount of this component is usualy expressed in terms of the polyhydroxy compound used in its preparation. The quantity of reductant is therefore most conveniently expressed in terms of the amount of polyhydroxy compound employed per 100 parts monomers in the polymerization system. This quantity is between about 0.1 and about 10 millimols of initial polyhydroxy compound per 100 parts by weight of monomeric material. If glycerol is the polyhydroxy compound used, this amount is within the range from 0.03 to 1 part per 100 parts monomers with the preferred range being from 0.08 to 0.75 part.

The activator ingredients are regarded as being comprised in a composition and have been designated in this manner. However, if desired, and as is usually the case, these ingredients can be introduced separately into the polymerization system, or a solution containing the iron salt and alkali metal pyrophosphate can be prepared and this mixture introduced with the reducing component being added separately. In the event that it is desired to prepare an activator composition, it may be readily accomplished by dissolving the iron salt and pyrophosphate in water and adding the reducing component, prepared as previously described, to this mixture.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Numerous variations may be introduced when carrying out polymerization reactions in which the activator compositions of this invention are employed. One method of effecting a butadiene-styrene copolymerization comprises charging the soap solution to the reactor, adding the activator composition followed by the styrene in which the modifier such as a mercaptan is dissolved, and then the butadiene. The peroxidic material is charged last after the reaction mixture has been brought to the desired temperature. In another method of operation the peroxidic material is dispersed in the soap solution, the reducing component added, and this mixture then charged to the reactor after which the mercaptan in admixture with the styrene is introduced followed by the butadiene. The temperature is then adjusted to the desired level and the aqueous solution containing the iron salt and pyrophosphate then injected. Any number of modifications of these procedures may be employed.

When operating according to the method of this invention, temperatures may range from −40 to 30° C., with temperatures from about −20 to 15° C. usually preferred.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

Emulsifying agents which are applicable in these polymerizations are materials such as salts of fatty acids of high molecular weight, salts of rosin acids and of disproportionated rosin acids, and of mixtures of such salts, particularly the sodium and potassium salts. Also, other emulsifying agents such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Advantages of this invention are illustrated by the following examples. The reactants, and their proportions, and the other specific ingredients of the recipes are presented as being typical and should not be construed to limit the invention unduly.

*Example I*

Glycerol was treated with hydrogen peroxide in the following manner: 100 parts by weight of glycerol (1.09 mols), 100 volumes of water, and a solution of 13 parts of recrystallized ferrous sulfate, $FeSO_4.7H_2O$ (0.04 mol), in 26 volumes of water were charged to a reactor and 800 volumes of 6 per cent hydrogen peroxide (1.4 mols) was introduced at a constant rate over a period of 3.5 hours. During the addition of the hydrogen peroxide the mixture was stirred constantly, and some free oxygen was evolved. The temperature varied from 58 to 68° C. Portions of the reaction mixture were tested for hydrogen peroxide at intervals during addition of the peroxide and none was found. Subsequent to the addition of the hydrogen peroxide the reaction mixture, which was yellow in color and had an aldehydic odor, was kept at 60° C. for 30 minutes and then transferred to a closed container and stored at 3° C. for 24 hours. The reaction mixture was then neutralized by treatment with calcium carbonate until evolution of carbon dioxide ceased. The resulting solution contained about 10 per by weight of the resulting reducing composition (primarily crude glycerose). Portions of this neutralized solution, having a concentration of about 10 per cent by weight, based on the original glycerol, were used in polymerizations carried out according to the following recipe.

| | Parts by weight |
|---|---|
| Butadiene | 75 |
| Styrene | 25 |
| Water | 180 |
| Potassium myristate | 5.0 |
| Cumene hydroperoxide, 72.4% pure. | 0.05–0.10 (0.24–0.48 millimol) |
| Tetiary $C_{12}$ mercaptan | 0.20 |
| Ferric Nitrate, $Fe(NO_3)_3.9H_2O$ | 0.036 (0.09 millimol) |

Potassium pyrophosphate, $K_4P_2O_7.3H_2O$___ 3.0 (7.8 millimols)
Reducing composition____ Variable All ingredients were charged to the reactor except ferric nitrate, which was added after the temperature was adjusted to 0° C. Polymerization was effected at 0° C. The following table shows the time conversion data obtained using various amounts of portions of the treated glycerol mixture and cumene hydroperoxide.

| Reducing Composition | | Cumene Hydroperoxide | | Conversion, Percent | | | | |
|---|---|---|---|---|---|---|---|---|
| Volumes of Soln. | Millimols [1] | Parts | Millimols | 1 Hr. | 2.5 Hrs. | 8 Hrs. | 20 Hrs. | 25 Hrs. |
| 1.4 | 1.5 | 0.05 | 0.24 | 10 | 16 | 39 | 68 | 79 |
| 1.4 | 1.5 | 0.10 | 0.48 | 12 | 24 | 43 | 72 | 81 |
| 2.8 | 3.0 | 0.05 | 0.24 | 11 | 18 | 41 | 48 | 57 |
| 2.8 | 3.0 | 0.10 | 0.48 | 13 | 19 | 43 | 75 | 86 |
| 5.6 | 6.1 | 0.10 | 0.48 | 16 | 26 | 47 | 82 | 83 |

[1] Millimols of glycerol, prior to treatment.

Control runs were made at 0° C. using the same polymerization recipe with 0.08 part cumene hydroperoxide (0.38 millimol) and variable amounts of untreated sugars, glucose, and fructose, instead of the treated glycerol mixture. The results are shown in the following table:

| Fructose | | Glucose | | Conversion, Percent | | | | | |
|---|---|---|---|---|---|---|---|---|---|
| Parts | Millimols | Parts | Millimols | 2 Hrs. | 4 Hrs. | 9.5 Hrs. | 21.5 Hrs. | 28 Hrs. | 44.5 Hrs. |
| 0.3 | 1.67 | | | 1 | 1 | 5 | 21 | 33 | 54 |
| 3.0 | 16.7 | | | 3 | 10 | 29 | 61 | 73 | 88 |
| | | 0.3 | 1.67 | 1 | 0 | 3 | 0 | 0 | 0 |
| | | 3.0 | 16.7 | 1 | 2 | 10 | 27 | 37 | 57 |

In each of the foregoing runs, as well as in other runs reported herein, the per cent conversion was determined by measuring the total solids present in a small sample of the reaction mixture. At low conversions this can be misleading, since a small amount of any solid material, such as soap, will be recorded as polymer. Such an inaccuracy is present when a conversion of 1 to 3 per cent is recorded after a short polymerization period but zero conversion is reported after a longer polymerization period. These results show that even when large quantities of sugars are employed, the results are inferior to those obtained with the treated glycerol.

Example II

Glycerol was treated with hydrogen peroxide in the presence of ferrous sulfate using the quantities of materials and the procedure given in Example I. After treatment of the reaction mixture with calcium carbonate, the resulting neutralized solution, which was dark green in color, was concentrated by evaporation of the water in vacuo at 50° C. When the volume of this solution has been reduced to about 250 volumes, the residue was a viscous syrup. To this syrup was added twice its volume of ethanol and the resulting mixture was warmed to about 70° C. and then filtered to separate the solution of organic compounds from precipitated iron and calcium salts. The filtrate was concentrated to a syrup by vacuum distillation at 30° C., so that the resulting concentrated solution had a concentration of about 30 to 40 per cent, by weight, based on the orignial glycerol. Portions thereof were then employed in variable amounts in polymerization reactions carried out at 0° C., using the recipe given in Example I. The results are herewith presented.

| Conc. Reducing Sol'n. | | Cumene Hydroperoxide, Millimols | Conversion, Percent | | | |
|---|---|---|---|---|---|---|
| Volumes | Millimols [1] | | 1 Hr. | 5 Hrs. | 10 Hrs. | 20 Hrs. |
| 0.1 | 0.32–0.44 | 0.24 | 5 | 27 | 43 | 64 |
| 0.2 | 0.65–0.87 | 0.24 | 9 | 33 | 48 | 71 |
| 0.4 | 1.3–1.7 | 0.24 | 7 | 34 | 50 | 77 |
| 0.8 | 2.6–3.5 | 0.24 | 14 | 38 | 50 | 75 |

[1] Millimols of untreated glycerol.

For control runs using glucose and fructose, see Example I.

Example III

The following procedure was employed for the treatment of glycerol with hydrogen peroxide: 10 parts by weight of glycerol and one part of ferrous sulfate ($FeSO_4.7H_2O$) were mixed, diluted to 20 volumes with water, and brought to the desired temperature, after which 80 volumes of 6 per cent hydrogen peroxide was added continuously over a period of two hours. The reaction mixture was stirred vigorously during the addition of the hydrogen peroxide.

Treatment of glycerol as described above was carried out at two temperatures, 34–36° C. and 50–55° C. At the higher temperature no hydrogen peroxide was found in the reaction mixture either at the mid-point or finish of the addition of hydrogen peroxide. At 34–36° C., the concentration of hydrogen peroxide found at the midpoint was 0.013 molar, and at the end, 0.0067 molar. Thus at 34° C. and above, hydrogen peroxide, when added over a period of two hours, is consumed as fast as it is introduced.

Portions of resulting reaction products from glycerol treated at the two temperature levels, as above described, were employed as the reductant in the polymerization recipe of Example I using 0.05 part cumene hydroperoxide (72.4 per cent pure) and 1.0 part potassium pyrophosphate instead of 3.0 parts given in Example I. The quantity of the treated glycerol mixture employed in each polymerization run was 2.8 volumes per 100 parts monomers, the solution having a concentration of about 10 per cent, by weight, based on the original glycerol. This represents about 3 millimols of the reductant. The reactions were carried out at 0° C. The following results were obtained:

| Temperature of Glycerol Treatment, °C | Conversion, Percent | | | | | |
|---|---|---|---|---|---|---|
| | 1 Hr. | 2.5 Hrs. | 6 Hrs. | 10 Hrs. | 20 Hrs. | 25 Hrs. |
| 34-36 | 13 | 26 | 41 | 53 | | 80 |
| 50-55 | 5 | 17 | 34 | 45 | 72 | 77 |

Three control runs were made at 0° C. using 3.0 parts fructose, instead of the treated glycerol mixture, and variable amounts of cumene hydroperoxide. The data are given below:

| Cumene Hydroperoxide | | Conversion, Percent | | | |
|---|---|---|---|---|---|
| Parts | Millimols | 2 Hrs. | 7 Hrs. | 10 Hrs. | 22 Hrs. |
| 0.04 | 0.19 | 0 | 13 | 24 | 57 |
| 0.08 | 0.38 | 1 | 16 | 26 | 54 |
| 0.16 | 0.76 | 0 | 13 | 20 | 57 |

It is thus seen that with a relatively large quantity of fructose the conversion rate is not so fast as when a small amount of treated glycerol is used as the reductant in the activator system.

*Example IV*

Treatment of glycerol was effected in the following manner: 10 parts by weight of glycerol, 65 volumes of water, and 1 part of ferrous sulfate ($FeSO_4.7H_2O$) were mixed and brought to a temperature of 43° C., after which 10 volumes of 30 per cent hydrogen peroxide was added continuously over a period of one hour and 20 minutes. The reaction mixture was stirred vigorously during the addition of the hydrogen peroxide and the temperature was maintained at 43-44° C. This treated mixture (about 3.7 millimols, of original glycerol per 100 parts monomers) was employed as the reducing component in the activator using the recipe of Example I with 1.0 part potassium pyrophosphate and 0.05 part of 72.4 per cent pure cumene hydroperoxide (0.24 millimol). Polymerization was carried out at 0° C. as in the preceding examples. The results were as follows:

| Time, Hours | Conversion, Percent |
|---|---|
| 1 | 14 |
| 3.5 | 30 |
| 6 | 36 |
| 9.5 | 50 |
| 12 | 61 |
| 22.5 | 88 |

For control runs, see Example III.

*Example V*

A series of reducing components to be used in iron salt-pyrophosphate activator systems was prepared by treating different sugars with hydrogen peroxide in the presence of ferrous sulfate. The procedure was as follows: 0.109 mol of the sugar (used instead of 10 parts by weight or 0.109 mol, of glycerol in preceding examples), 65 volumes of water, and one part of ferrous sulfate ($FeSO_4.7H_2O$) were mixed and brought to a temperature of 43° C., after which a 30 per cent solution of hydrogen peroxide was added continuously with constant stirring over a period of approximately two hours. The temperature throughout the reaction was held at 43-44° C. Sugars employed in the above described preparation were glucose, fructose, and sucrose. The mols hydrogen peroxide per mol of treated sugar was varied in different preparations.

The various reducing components prepared in the manner described were employed in variable amounts in the following polymerization recipe:

| | Parts by weight |
|---|---|
| Butadiene | 75 |
| Styrene | 25 |
| Water | 180 |
| Potassium myristate | 5.0 |
| Cumene hydroperoxide, 72.4% | 0.05 (0.24 millimol) |
| Tertiary $C_{12}$ mercaptan | 0.20 |
| Ferric nitrate, $Fe(NO_3)_3.9H_2O$ | 0.036 (0.09 millimol) |
| Potassium pyrophosphate, $K_4P_2O_7.3H_2O$ | 1.0 (2.6 millimols) |
| Treated sugar | Variable. |

Polymerization was carried out at 0° C. The following table shows the sugar treated to make the reducing composition, mols of hydrogen peroxide per mol of treated sugar in making the reducing composition, parts of the resulting reducing composition used per 100 parts monomers, and conversion after 12 hours.

| Treated Sugar | Mols $H_2O_2$ Per Mol Sugar Used in Treatment | Reductant Sol'n. Treated Sugar per Millimols/100 Parts Monomers | Conversion, Percent, 12 Hours |
|---|---|---|---|
| Glucose | 0.94 | 3.1 | 64 |
| Do | 1.98 | 2.8 | 48 |
| Fructose | 0.94 | 1.6 | 66 |
| Sucrose | 0.94 | 1.3 | 60 |
| Do | 1.98 | 1.2 | 55 |
| Do | 2.79 | ¹ 0.2 | 46 |
| Do | 3.43 | ¹ 1.1 | 47 |
| Do | 3.43 | ¹ 0.5 | 47 |
| Do | 0.47 | 1.4 | 56 |
| Do | 0.97 | 1.3 | 53 |
| Do | 0.97 | 0.6 | 55 |

¹ Reaction mixture stored one week at room temperature before use.

These results show that very active reducing components are formed by treatment of various sugars with hydrogen peroxide in the presence of ferrous sulfate. These results also show that much more rapid polymerization rates are obtained with treated sugars, when used in very small quantities, than with other sugars such as glucose and fructose when used in much larger quantities. (See Examples I and III for control runs.)

*Example VI*

A solution of 30 parts by weight of tartaric acid and one part of ferrous sulfate heptahydrate in 400 volumes of water was cooled to 0° C. and 19 volumes of 9.48 molar hydrogen peroxide added over a period of two hours, with constant stirring, keeping the mixture at 0° C. Concentrated sulfuric acid (50 volumes) was then added slowly with cooling and the mixture then stored several days at 5° C. The supernatant liquid was separated from the crystals which formed and this liquid then used as the reductant instead of treated sugar in the polymerization recipe given in Example V. The amount used per 100 parts monomers was about 1.2 millimols, based on original tartaric acid. An amount of potassium hydroxide sufficient to neutralize 90 per cent of the acid present in the treated tartaric acid mixture, as determined by titration, was added to the charge. The following time-conversion data were obtained:

| Time, Hours | Conversion, Percent |
|---|---|
| 1.5 | 16 |
| 3 | 22 |
| 4.5 | 29 |
| 7.5 | 46 |
| 11.5 | 65 |
| 23 | 74 |

As will be evident to those skilled in the art, various modifications of this invention can be made, or followed, in the light of the foregoing disclosure and discussion, without departing from the spirit or scope of the disclosure or from the scope of the claims.

We claim:

1. A process for the production of a polymer of high molecular weight, which comprises polymerizing a monomeric material comprising a conjugated diene while dispersed in an aqueous medium in the presence of a polymerization catalyst composition comprising an organic hydroperoxide, a water-soluble iron salt and a water-soluble pyrophosphate, and a reducing composition resulting from treating 0.1 to 10 millimols of a sugar with hydrogen peroxide in the presence of a water-soluble ferrous salt while in aqueous solution, with a mol ratio of said sugar to hydrogen peroxide between 0.3:1 and 5:1 and of said sugar to ferrous salt between 1:1 and 10:1, said millimols being per 100 parts by weight of said monomeric material.

2. A process for the production of a polymer of high molecular weight, which comprises polymerizing a monomeric material comprising a conjugated diene while dispersed in an aqueous medium in the presence of a polymerization catalyst composition comprising an organic hydroperoxide, a water-soluble iron salt and a water-soluble pyrophosphate, and a reducing composition resulting from treating 0.1 to 10 millimols of glucose with hydrogen peroxide in the presence of a water-soluble ferrous salt while in aqueous solution, with a mol ratio of glucose to hydrogen peroxide between 0.3:1 and 5:1 and of glucose to ferrous salt between 1:1 and 10:1, said millimols being per 100 parts by weight of said monomeric material.

3. An improved process for the production of synthetic rubber, which comprises establishing and maintaining at a polymerization temperature between 30 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.06 to 4 millimols of an organic peroxide, 0.01 to 1 millimol of an iron salt and 0.1 to 15 millimols of a pyrophosphate, each water soluble, and a reducing composition resulting from treating 0.1 to 10 millimols of glucose with hydrogen peroxide in the presence of ferrous sulfate while in aqueous solution, with a mol ratio of said glucose to hydrogen peroxide between 0.3:1 and 5:1 and of said glucose to ferrous sulfate between 1:1 and 10:1, said parts being parts by weight per 100 parts by weight of said monomeric material.

4. An improved process for the production of synthetic rubber, which comprises establishing and maintaining at a polymerization temperature between 30 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.06 to 4 millimols of an organic peroxide, 0.01 to 1 millimol of an iron salt and 0.1 to 15 millimols of a pyrophosphate, each water soluble, and a reducing composition resulting from treating 0.1 to 10 millimols of fructose with hydrogen peroxide in the presence of ferrous sulfate while in aqueous solution, with a mol ratio of said fructose to hydrogen peroxide between 0.3:1 and 5:1 and of said fructose to ferrous sulfate between 1:1 and 10:1, said parts being parts by weight per 100 parts by weight of said monomeric material.

5. An improved process for the production of synthetic rubber, which comprises establishing and maintaining at a polymerization temperature between 30 and −40° C. an emulsion of an aqueous phase having a pH between 9 and 12, a liquid monomeric material comprising a major amount of 1,3-butadiene and a minor amount of styrene, an alkali metal soap emulsifying agent, an alkyl mercaptan having between eight and sixteen carbon atoms per molecule, and a polymerization catalyst composition comprising 0.06 to 4 millimols of an organic peroxide, 0.01 to 1 millimol of an iron salt and 0.1 to 15 millimols of a pyrophosphate, each water soluble, and a reducing composition resulting from treating 0.1 to 10 millimols of sucrose with hydrogen peroxide in the presence of ferrous sulfate while in aqueous solution, with a mol ratio of said sucrose to hydrogen peroxide between 0.3:1 and 5:1 and of said sucrose to ferrous sulfate between 1:1 and 10:1, said parts being parts by weight per 100 parts by weight of said monomeric material.

6. A process for producing an organic polymer of high molecular weight, which comprises polymerizing while dispersed in an aqueous medium a monomeric material comprising an organic compound containing an active $CH_2=C<$ group and polymerizable while dispersed in an aqueous medium in the presence of a catalyst composition comprising an organic peroxide, a water-soluble iron salt and a water-soluble pyrophosphate and a reducing composition resulting from treating glucose with hydrogen peroxide in the presence of a water-soluble ferrous salt while in aqueous solution.

7. A process for producing an organic polymer of high molecular weight, which comprises polymerizing while dispersed in an aqueous medium a monomeric material comprising an organic compound containing an active $CH_2=C<$ group and polymerizable while dispersed in an aqueous medium in the presence of a catalyst composition comprising an organic peroxide, a water-soluble iron salt and a water-soluble pyrophosphate and a reducing composition resulting from treating fructose with hydrogen peroxide in the presence of a water-soluble ferrous salt while in aqueous solution.

8. A process for producing an organic polymer of high molecular weight, which comprises polymerizing while dispersed in an aqueous medium a monomeric material comprising an organic compound containing an active $CH_2=C<$ group and polymerizable while dispersed in an aqueous medium in the presence of a catalyst composition comprising an organic peroxide, a water-soluble iron salt and a water-soluble pyrophosphate and a reducing composition resulting from treating sucrose with hydrogen peroxide in the presence of a water-soluble ferrous salt while in aqueous solution.

9. A process for the production of a polymer of high molecular weight, which comprises polymerizing monomeric material comprising an organic compound containing an active $CH_2=C<$ group while dispersed in an aqueous medium in the presence of a polymerization catalyst composition comprising an organic hydroperoxide, a water-soluble iron salt and a water-soluble pyrophosphate, and a reducing composition resulting from treating 0.1 to 10 millimols of a sugar with hydrogen peroxide in the presence of a water-soluble ferrous salt while in aqueous solution, with a mol ratio of sugar to hydrogen peroxide between 0.3:1 and 5:1 and of said sugar to ferrous salt between 1:1 and 10:1, said millimols being per 100 parts by weight of said monomeric material.

IZAAK M. KOLTHOFF.
AVROM I. MEDALIA.

References Cited in the file of this patent

UNITED STATES PATENTS

| Number | Name | Date |
|---|---|---|
| 2,380,476 | Stewart | July 31, 1945 |

OTHER REFERENCES

Vanderberg et al.: Ind. and Eng. Chem., vol. 40, No. —, May 1948, pp. 932–937.

Karrer: "Organic Chemistry," Nordeman Pub. Co. Inc., N. Y., 1938, page 282.